United States Patent
Saegusa

[11] Patent Number: 5,846,505
[45] Date of Patent: Dec. 8, 1998

[54] METHOD FOR PRODUCING DOUBLE METAL OXIDE POWDER

[75] Inventor: Kunio Saegusa, Tsukuba-gun, Japan

[73] Assignee: Sumitomo Chemical Company, Limited, Osaka, Japan

[21] Appl. No.: 565,104

[22] Filed: Nov. 30, 1995

[30] Foreign Application Priority Data

Nov. 30, 1994 [JP] Japan ..................... 6-323490

[51] Int. Cl.⁶ ..................... C01F 17/00
[52] U.S. Cl. .......... 423/263; 423/593; 423/594; 423/596; 423/600
[58] Field of Search .................. 423/263, 593, 423/594, 596, 598, 600

[56] References Cited

FOREIGN PATENT DOCUMENTS

| 0 439620 | 8/1990 | European Pat. Off. . |
| 0 545775 | 11/1992 | European Pat. Off. . |
| 0 620188 | 4/1994 | European Pat. Off. . |
| 0 666239 | 8/1994 | European Pat. Off. . |

OTHER PUBLICATIONS

Twu, et al., "Preparation of Bulk and Supported Perovskites", Properties and Applications of Perovskite–Type Oxides, vol. 50, 1993 Basel (CH), pp. 1–23, no month.

Derwent abstract of Jap. Pub., "Production of Superconductor", JP–A–63195116, (1988), no month.

Ceramic Transactions, vol. 22, Ceramic Powder Science IV, pp. 15–25, Mar. 12–15, 1991 by K. Abe, et al.

Journal of Research of the National Bureau of Standards, Clabaugh et al., vol. 56, No. 5(1956), pp. 289–291, May, 1956.

*Primary Examiner*—Ferris Lander
*Attorney, Agent, or Firm*—Birch, Stewart, Kolasch & Birch, LLP

[57] ABSTRACT

A method for producing a double metal oxide of the general formula: $XMO_3$ in which X is Li, Na, K, Pb, Ba, Mg, Ca, Sr, La, Y or Bi, and M is Al, Mn, Ti, Zr, Sn, Mg, Zn, Fe, Co, Ni, Nb, Ta or W, which has a narrow particle size distribution and contains few agglomerates, by calcining a mixture of a simple oxide of metal X and a simple oxide of metal M; amorphous double metal oxide particles comprising X and M or their mixture; or metal oxide precursors which are converted to said simple metal oxides or said double metal oxide, in the presence of iodine or hydrogen iodide.

7 Claims, 4 Drawing Sheets

METHOD FOR PRODUCING DOUBLE METAL OXIDE POWDER

BACKGROUND OF THE INVENTION

1. Field of the Invention

The present invention relates to a method for producing a double metal oxide represented by the formula: $XMO_3$.

2. Description of the Related Art

Hitherto, powder of a $ABO_3$ type metal oxide such as barium titanate, lead titanate zirconate, lithium tantalate, and so on is used as a material of a ceramic capacitor or a frequency filter by virtue of its dielectric property and piezoelectric property. In general, such metal oxide powder is produced in the form of a dielectric powder having a particle size of 0.5 to 5 μm by a solid phase reaction comprising calcining powder of a metal oxide, a carbonate, and so on at a high temperature, or a co-precipitation method comprising a reaction in an aqueous solution of raw materials. In the production, properties of the metal oxide powder used as a raw material have great influence on the production process, and function and physical properties of the produced ceramic. Therefore, it is strongly desired to provide a method for producing a metal oxide powder having a powder property which is precisely controlled according to the intended final use.

When the metal oxide powder is used in a dispersed state as in a piezoelectric composite, a filler, a pigment, and the like, properties of each particle are reflected directly on the properties of the product. Therefore, the control of the powder property is more important.

According to kinds of the metal oxides and final applications of the metal oxides, properties required for the metal oxide powder vary widely. Commonly required properties are a uniform particle size of metal oxide particles, that is, a narrow distribution of particle size, and weak bonding among primary particles, that is, less agglomeration and good dispersibility.

Hitherto, as a method for producing a metal oxide powder comprising two or more metal elements, there is known a method comprising calcining a mixed powder of metal oxides having a composition corresponding to a chemical composition of a product in an air or an inert gas. But, by this method, it is difficult to produce a single phase of a metal oxide which is a compound of two or more metal elements and oxygen. To obtain a single phase product, the raw materials should be calcined at a high temperature, or calcination and grinding should be repeated several times.

In addition, there is known a method for producing metal oxide powder comprising two or more metal elements by the liquid phase method such as a precipitation method, a co-precipitation method, a hydrolysis method, etc. The liquid phase method comprises preparing a precursor powder of a metal oxide such as a hydroxide from a solution of metal salts in water or an organic solvent, and calcining the precursor powder in the air or the inert gas to obtain a metal oxide powder comprising two or more metal elements (see W. S. Gallagher et al., J. Res. Nat. Bur. of Stand., 56, 289 (1956)).

All the above methods require the calcination step in an oxygen-containing atmosphere, a nitrogen atmosphere, an inert gas atmosphere or a hydrogen-containing atmosphere. The metal oxide powder produced under such conditions has strong bonding of primary particles, and firmly agglomerated. Then, grinding of the powder is essential after the calcination step. But, since it is difficult to break the bonding of the primary particles by the grinding, the obtained powder has a broad distribution of the particle size. Further, contamination from a grinding medium is unavoidable.

It is generally known to calcine the mixed powder of the metal oxides in the presence of a flux component. Since the flux component interlocks after the calcination in this method, grinding of the calcined powder and removal of the flux component are necessary, and the flux component may remain in the produced metal oxide.

It is also known to produce a metal oxide powder comprising two or more metals by a hydrothermal synthesis method. This method requires a high temperature and high pressure, and cannot produce the metal oxide powder at an industrially advantageous rate (see K. Abe et al., Ceramic Powder Science IV, American Ceramic Soc., 15–25 (1991)).

Furthermore, as a method for producing a metal oxide powder, there is known a gas phase reaction method which produces a metal oxide fine powder having a narrow distribution of particle size and containing less agglomerates through a chemical reaction of vaporized metals or metal compound in a vapor phase. But, in the gas phase reaction method, production steps of particles are complicated and difficult to control, and parameters of an apparatus have large influence on the reaction. In addition, the raw materials and the apparatus are expensive. Then, the gas phase reaction method is not necessarily an effective method in the industry. The gas phase reaction method produces only a single metal oxide, and has not been applied to the production of a double metal oxide.

SUMMARY OF THE INVENTION

An object of the present invention is to provide a method for producing a double metal oxide having a narrow distribution of particle size, and containing less agglomerates.

According to the present invention, there is provided a method for producing a double metal oxide of the general formula:

$$XMO_3$$

wherein X is at least one metal element selected from the group consisting of Li, Na, K, Pb, Ba, Mg, Ca, Sr, La, Y and Bi, and M is at least one metal element selected from the group consisting of Al, Mn, Ti, Zr, Sn, Mg, Zn, Fe, Co, Ni, Nb, Ta and W, comprising calcining a mixture of a simple oxide of metal X and a simple oxide of metal M; amorphous double metal oxide particles comprising X and M or their mixture; or metal oxide precursors which are converted to said simple metal oxides or said double metal oxide, in the presence of iodine or hydrogen iodide.

DETAILED DESCRIPTION OF THE INVENTION

The present invention will be explained in detail.

The double metal oxide to be produced by the method of the present invention is a compound comprising at least two metal elements and oxygen atoms, which is represented by the general formula:

$$XMO_3$$

wherein X and M are the same as defined above.

Specific examples of such oxide are perovskite metal oxides.

X or M may comprise plural metal elements. To satisfy an electrically neutral condition, a total charge of the metal elements is 6. A charge of each of X and M is an integer of 1 to 5. The total charge is a sum of products of the valency of the metal and a molar fraction for all the metal elements.

For example, in the case of $PbTiO_3$, the total charge is calculated by the following formula:

Charge of Pb (2)×Molar fraction of Pb+Charge of Ti (4)×Molar fraction of Ti=2×1+4×1=6.

In the case of $Ba(Mg_{1/3}Ta_{2/3})O_3$, the total charge is calculated by the following formula:

Charge of Ba (2)×Molar fraction of Ba+Charge of Mg (2)×Molar fraction of Mg+Charge of Ta×Molar fraction of Ta=2×1+2×⅓+ 5×⅔=6.

Examples of the double metal oxide of the formula $XMO_3$ are aluminate salts, titanate salts, zirconate salts, niobate salts, tantalate salts, tungstate salts, stannate salts, and so on. Specific examples are as follows:
$LiNbO_3$, $LiTaO_3$, $LiWO_3$, $NaNbO_3$, $NaTaO_3$, $NaWO_3$, $KNbO_3$, $KTaO_3$, $KWO_3$, $PbTiO_3$, $PbZrO_3$, $PbSnO_3$, $Pb(Mg_{1/3}Nb_{2/3})O_3$, $Pb(Mg_{1/3}Ta_{2/3})O_3$, $Pb(Mg_{1/3}W_{2/3})O_3$, $Pb(Zn_{1/3}Nb_{2/3})O_3$, $Pb(Zn_{1/3}Ta_{2/3})O_3$, $Pb(Zn_{1/3}W_{2/3})O_3$, $Pb(Fe_{1/3}Nb_{2/3})O_3$, $Pb(Fe_{1/3}Ta_{2/3})O_3$, $Pb(Fe_{1/3}W_{2/3})O_3$, $Pb(Ni_{1/3}Nb_{2/3})O_3$, $Pb(Ni_{1/3}Ta_{2/3})O_3$, $Pb(Ni_{1/3}W_{2/3})O_3$, $Pb(Co_{1/3}Nb_{2/3})O_3$, $Pb(Co_{1/3}Ta_{2/3})O_3$, $Pb(Co_{1/3}W_{2/3})O_3$, $MgTiO_3$, $MgZrO_3$, $MgSnO_3$, $Mg(Mg_{1/3}Nb_{2/3})O_3$, $Mg(Mg_{1/3}Ta_{2/3})O_3$, $Mg(Mg_{1/3}W_{2/3})O_3$, $Mg(Zn_{1/3}Nb_{2/3})O_3$, $Mg(Zn_{1/3}Ta_{2/3})O_3$, $Mg(Zn_{1/3}W_{2/3})O_3$, $Mg(Fe_{1/3}Nb_{2/3})O_3$, $Mg(Fe_{1/3}Ta_{2/3})O_3$, $Mg(Fe_{1/3}W_{2/3})O_3$, $Mg(Ni_{1/3}Nb_{2/3})O_3$, $Mg(Ni_{1/3}Ta_{2/3})O_3$, $Mg(Ni_{1/3}W_{2/3})O_3$, $Mg(Co_{1/3}Nb_{2/3})O_3$, $Mg(Co_{1/3}Ta_{2/3})O_3$, $Mg(Co_{1/3}W_{2/3})O_3$, $CaTiO_3$, $CaZrO_3$, $CaSnO_3$, $Ca(Mg_{1/3}Nb_{2/3})O_3$, $Ca(Mg_{1/3}Ta_{2/3})O_3$, $Ca(Mg_{1/3}W_{2/3})O_3$, $Ca(Zn_{1/3}Nb_{2/3})O_3$, $Ca(Zn_{1/3}Ta_{2/3})O_3$, $Ca(Zn_{1/3}W_{2/3})O_3$, $Ca(Fe_{1/3}Nb_{2/3})O_3$, $Ca(Fe_{1/3}Ta_{2/3})O_3$, $Ca(Fe_{1/3}W_{2/3})O_3$, $Ca(Ni_{1/3}Nb_{2/3})O_3$, $Ca(Ni_{1/3}Ta_{2/3})O_3$, $Ca(Ni_{1/3}W_{2/3})O_3$, $Ca(Co_{1/3}Nb_{2/3})O_3$, $Ca(Co_{1/3}Ta_{2/3})O_3$, $Ca(Co_{1/3}W_{2/3})O_3$, $SrTiO_3$, $SrZrO_3$, $SrSnO_3$, $Sr(Mg_{1/3}Nb_{2/3})O_3$, $Sr(Mg_{1/3}Ta_{2/3})O_3$, $Sr(Mg_{1/3}W_{2/3})O_3$, $Sr(Zn_{1/3}Nb_{2/3})O_3$, $Sr(Zn_{1/3}Ta_{2/3})O_3$, $Sr(Zn_{1/3}W_{2/3})O_3$, $Sr(Fe_{1/3}Nb_{2/3})O_3$, $Sr(Fe_{1/3}Ta_{2/3})O_3$, $Sr(Fe_{1/3}W_{2/3})O_3$, $Sr(Ni_{1/3}Nb_{2/3})O_3$, $Sr(Ni_{1/3}Ta_{2/3})O_3$, $Sr(Ni_{1/3}W_{2/3})O_3$, $Sr(Co_{1/3}Nb_{2/3})O_3$, $Sr(Co_{1/3}Ta_{2/3})O_3$, $Sr(Co_{1/3}W_{2/3})O_3$, $BaTiO_3$, $BaZrO_3$, $BaSnO_3$, $Ba(Mg_{1/3}Nb_{2/3})O_3$, $Ba(Mg_{1/3}Ta_{2/3})O_3$, $Ba(Mg_{1/3}W_{2/3})O_3$, $Ba(Zn_{1/3}Nb_{2/3})O_3$, $Ba(Zn_{1/3}Ta_{2/3})O_3$, $Ba(Zn_{1/3}W_{2/3})O_3$, $Ba(Fe_{1/3}Nb_{2/3})O_3$, $Ba(Fe_{1/3}Ta_{2/3})O_3$, $Ba(Fe_{1/3}W_{2/3})O_3$, $Ba(Ni_{1/3}Nb_{2/3})O_3$, $Ba(Ni_{1/3}Ta_{2/3})O_3$, $Ba(Ni_{1/3}W_{2/3})O_3$, $Ba(Co_{1/3}Nb_{2/3})O_3$, $Ba(Co_{1/3}Ta_{2/3})O_3$, $Ba(Co_{1/3}W_{2/3})O_3$, $LaAlO_3$, $LaMnO_3$, $LaFeO_3$, $LaCoO_3$, $LaNiO_3$, $YAlO_3$, $YMnO_3$, $YFeO_3$, $YCoO_3$, $YNiO_3$, and their solid solutions.

In the method of the present invention, a mixture of a simple oxide of metal X and a simple oxide of metal M; amorphous double metal oxide particles comprising X and M or their mixture; or metal oxide precursors which are converted to the simple metal oxides or the double metal oxide is or are calcined in the presence of iodine or hydrogen iodide.

In the production method, the mixture of the simple oxide of metal X and the simple oxide of metal M; the amorphous double metal oxide particles comprising X and M or their mixture; or the metal oxide precursors which are converted to the simple metal oxides or the double metal oxide are preferably used in amounts such that the elements satisfy the composition of the general formula $XMO_3$ in view of the production efficiency.

The precursor of the metal oxide is intended to mean a compound which generates a metal oxide comprising one or more metal elements and oxygen atoms by a decomposition or oxidation in the calcination step. Specific examples of the precursor of the metal oxide are metal hydroxide, metal carbonates, metal oxalates, metal nitrates, metal sulfates, metal acetates, metal citrates, and the like.

Examples of the simple metal oxide of the metal X and the precursor of the metal oxide of the metal X are as follows:
lead compounds such as lead oxide, lead hydroxide, lead carbonate, lead oxalate, lead nitrate, lead sulfate, lead acetate, etc.;
lithium compounds such as lithium oxide, lithium hydroxide, lithium carbonate, lithium oxalate, lithium nitrate, lithium sulfate, lithium acetate, etc.;
sodium compounds such as sodium oxide, sodium hydroxide, sodium carbonate, sodium oxalate, sodium nitrate, sodium sulfate, sodium acetate, etc.;
potassium compounds such as potassium oxide, potassium hydroxide, potassium carbonate, potassium oxalate, potassium nitrate, potassium sulfate, potassium acetate, etc.;
magnesium compounds such as magnesium oxide, magnesium hydroxide, magnesium carbonate, magnesium oxalate, magnesium nitrate, magnesium sulfate, magnesium acetate, etc.;
calcium compounds such as calcium oxide, calcium hydroxide, calcium carbonate, calcium oxalate, calcium nitrate, calcium sulfate, calcium acetate, etc.;
strontium compounds such as strontium oxide, strontium hydroxide, strontium carbonate, strontium oxalate, strontium nitrate, strontium sulfate, strontium acetate, etc.;
barium compounds such as barium oxide, barium hydroxide, barium carbonate, barium oxalate, barium nitrate, barium sulfate, barium acetate, etc.;
lanthanum compounds such as lanthanum oxide, lanthanum hydroxide, lanthanum carbonate, lanthanum oxalate, lanthanum nitrate, lanthanum sulfate, lanthanum acetate, etc.;
yttrium compounds such as yttrium oxide, yttrium hydroxide, yttrium carbonate, yttrium oxalate, yttrium nitrate, yttrium sulfate, yttrium acetate, etc.;
and the like.

Examples of the simple metal oxide of metal M and the precursor of the metal oxide of metal M are as follows:
aluminum compounds such as aluminum oxide, aluminum hydroxide, aluminum oxalate, aluminum nitrate, aluminum sulfate, aluminum acetate, etc.;
manganese compounds such as manganese oxide, manganese hydroxide, manganese carbonate, manganese oxalate, manganese nitrate, manganese sulfate, manganese acetate, etc.;

titanium compounds such as titanium oxide, titanyl hydroxide, titanyl oxalate, titanyl nitrate, titanyl sulfate, titanyl acetate, etc.;

tin compounds such as tin oxide, metastannic acid, tin oxalate, tin nitrate, tin sulfate, tin acetate, etc.;

zirconium compounds such as zirconium oxide, zirconium hydroxide, zirconium oxalate, zirconium nitrate, zirconium sulfate, zirconium acetate, etc.;

iron compounds such as iron oxide, iron hydroxide, iron carbonate, iron oxalate, iron nitrate, iron sulfate, iron acetate, etc.;

cobalt compounds such as cobalt oxide, cobalt hydroxide, cobalt carbonate, cobalt oxalate, cobalt nitrate, cobalt sulfate, cobalt acetate, etc.;

nickel compounds such as nickel oxide, nickel hydroxide, nickel carbonate, nickel oxalate, nickel nitrate, nickel sulfate, nickel acetate, etc.;

magnesium compounds such as magnesium oxide, magnesium hydroxide, magnesium carbonate, magnesium oxalate, magnesium nitrate, magnesium sulfate, magnesium acetate, etc.;

zinc compounds such as zinc oxide, zinc hydroxide, zinc carbonate, zinc oxalate, zinc nitrate, zinc sulfate, zinc acetate, etc.;

niobium compounds such as niobium oxide, niobium hydroxide, niobium oxalate, niobium nitrate, niobium sulfate, niobium acetate, etc.;

tantalum compounds such as tantalum oxide, tantalum hydroxide, tantalum . oxalate, tantalum nitrate, tantalum sulfate, tantalum acetate, etc.;

tungsten compounds such as tungsten oxide, tungsten hydroxide, tungsten oxalate, tungsten nitrate, tungsten sulfate, tungsten acetate, etc.;

and the like.

Examples of the precursor of the double metal oxide comprising metal elements X and M are double oxalate salts, double citrate salts, and so on.

Specific examples of such precursor are as follows:

titanyl oxalate compounds such as barium titanyl oxalate, lead titanyl oxalate, strontium titanyl oxalate, calcium titanyl oxalate, magnesium titanyl oxalate, etc.;

zirconyl oxalate compounds such as barium zirconyl oxalate, lead zirconyl oxalate, strontium zirconyl oxalate, calcium zirconyl oxalate, magnesium zirconyl oxalate, etc.;

titanyl citrate compounds such as barium titanyl citrate, lead titanyl citrate, strontium titanyl citrate, calcium titanyl citrate, magnesium titanyl citrate, etc.;

zirconyl citrate compounds such as barium zirconyl citrate, lead zirconyl citrate, strontium zirconyl citrate, calcium zirconyl citrate, magnesium zirconyl citrate, etc.; and the like.

As the raw materials, a mixture of amorphous and/or crystalline oxides containing the oxide comprising the metal X and the oxide comprising the metal M, or an amorphous double oxide of the general formula: $XMO_3$ may be used.

To control the particle size and the particle size distribution of the intended metal oxide powder, the raw material powder may contain a seed crystal.

The above described various raw material powders to be used in the present invention are so-called powders, and preferably have a bulk density of 40% or less of the theoretical density. When a powder having a bulk density larger than 40% of the theoretical density is calcined, a sintering reaction takes place in the calcination step, and then the grinding of the calcined product may be necessary.

One of the most important characteristics of the present invention is that iodine gas and/or hydrogen iodide gas are/is selected as an atmosphere gas in which the raw material powder is calcined.

When the iodine gas or the hydrogen iodide gas is used, a difference of a free energy between the raw material powder and the intended double metal oxide is a large negative value, whereby the desired product is stably produced.

If chlorine or hydrogen chloride is used, a difference of a free energy between the raw material powder and the intended double metal oxide may be a positive value for some raw material powders, and it is very difficult to produce the desired product. These cases will be explained below:

(1) When an atmospheric gas ($Z_2$ or HZ wherein Z is a halogen atom) is chlorine or hydrogen chloride, since hydrogen chloride is very stable in the equilibrium, and an oxide of M is more stable than a chloride of M, the reaction proceeds as follow:

$$XZ_m + MO_{n/2} + (m+n)/2 \cdot H_2O \rightarrow XMO_3 + (m+n) \cdot HZ \qquad (1)$$

wherein m and n are valencies of the metals Z and M, respectively.

(2) When an atmospheric gas ($Z_2$ or HZ wherein Z is a halogen atom) is iodine or hydrogen iodide, since iodine is stable at a temperature of 500° C. or higher, and an oxide of M is stable in such temperature range, the reaction proceeds as follow:

$$XZ_m + MO_{n/2} + (m+n)/4 \cdot O_2 \rightarrow XMO_3 + (m+n)/2 \cdot Z_2 \qquad (2)$$

When the atmosphere gas is chlorine or hydrogen chloride, the free energy change in equation (1), which indicates a difference of stability between the metal oxide and the metal chloride, is calculated for various oxides at 900° C. as follows:

$PbTiO_3$: +40.4 KJ/mole
$MgTiO_3$: −63 KJ/mole
$SrTiO_3$: +10.6 KJ/mole
$BaTiO_3$: +58.4 KJ/mole
$BaZrO_3$: +84.5 KJ/mole
$LiNbO_3$: −27 KJ/mole
$LiTaO_3$: −12.5 KJ/mole
$LaCrO_3$: +64.9 KJ/mole.

When the atmosphere gas is iodine or hydrogen iodide, the free energy change in equation (2), which indicates a difference of stability between the metal oxide and the metal iodide, is calculated for various oxides at 900° C. as follows:

$PbTiO_3$: −47 KJ/mole
$MgTiO_3$: −244 KJ/mole
$SrTiO_3$: −148 KJ/mole
$BaTiO_3$: −102 KJ/mole
$BaZrO_3$: −76 KJ/mole
$LiNbO_3$: −109 KJ/mole
$LiTaO_3$: −94 KJ/mole
$LaCrO_3$: −300 KJ/mole.

Since the larger negative value of the free energy difference is more favorable to the synthesis of the product, it is apparent that the oxide is far dominantly produced when the atmosphere gas is iodine and/or hydrogen iodide.

In the present invention, the iodine gas or the hydrogen iodide gas is used in an amount of at least 1 vol. %, more preferably at least 5 vol. %, in particular, from 5 vol. % to 50 vol. % of the whole volume of the atmosphere gas.

As a diluent gas for the iodine gas and/or the hydrogen iodide gas in the atmosphere gas, inert gas such as nitrogen or argon, oxygen, steam, hydrogen, or air may be used.

A pressure of the atmosphere gas containing iodine or hydrogen iodide is not limited, and selected from a pressure range which is used in the industry.

A source of the atmosphere gas and a method for supplying the same are not limited. Any source and any method can be used, as long as the atmosphere gas can be intruded in a reaction system containing the raw material powder.

As a source of the atmosphere gas, a cylinder gas is used in general. Alternatively, the atmosphere gas containing iodine or hydrogen iodide is prepared from an iodine compound such as ammonium iodide, or an iodine-containing polymer. Further, a mixture of the raw material powder and the iodine compound or the iodine-containing polymer is calcined in a furnace to form the atmosphere gas.

When a decomposition gas of, for example, ammonium iodide is used, deposition of a solid material in the calcination furnace may cause a trouble in operation. Therefore, it is preferred to supply the iodine or hydrogen iodide gas directly in the furnace from the cylinder, and so on.

The atmosphere gas may be supplied batchwise or continuously.

According to the method of the present invention, since the raw material powder is calcined in the above atmosphere gas, through the functions of the raw material powder and the atmosphere gas, the metal oxide grows to form the desired double metal oxide consisting of particles which have polyhedral shapes and a narrow particle size distribution, and containing less agglomerates. Then, when the raw material powder is filled in a container and simply calcined in the atmosphere gas, the desired double metal oxide is obtained.

A calcination temperature depends on the kind of the intended double metal oxide, the concentration of iodine or hydrogen iodide in the atmosphere gas, or a calcination time, and is not limited. Preferably, the calcination temperature is from 500° C. to 1500° C., more preferably from 600° C. to 1400° C., in particular from 800° C. to 1200° C.

When the calcination temperature is lower than 500° C., it is difficult to produce the desired double metal oxide which is the compound comprising two or more metal elements and oxygen atoms, or the solid solution thereof, or the calcination may require the longer time. When the calcination temperature exceeds 1500° C., the produced double metal oxide tends to contain more agglomerates.

The calcination time depends on the kind of the intended double metal oxide, the concentration of iodine or hydrogen iodide in the atmosphere gas, or the calcination temperature, and is not limited. The calcination time is preferably at least one minute, more preferably at least 10 minutes, and selected from a time range in which the desired double metal oxide is produced. As the calcination temperature rises, the calcination time is shortened.

A type of a calcination apparatus is not limited, and any type of a calcination furnace can be used. Preferably, the calcination furnace is made of a material which is not corroded by the hydrogen iodide or iodine gas. More preferably, the furnace has a mechanism for adjusting a composition of the atmosphere gas.

Since an acidic gas such as the iodine or hydrogen iodide gas is used, the calcination furnace has air tightness. In the industrial production, the calcination is preferably carried out continuously. For example, a tunnel furnace, a rotary kiln or a pusher furnace can be used.

Since the reaction proceeds in the acidic atmosphere, as the container in which the raw material is filled for calcination, a crucible or a boat made of, for example, alumina, quartz, acid-resistant brick, graphite or a noble metal (e.g. platinum) is preferably used.

By the above explained method, the metal oxide powder, which is the compound of the two or more metal elements and oxygen atoms and consists of the uniform particles having the narrow particle size distribution with including no or few agglomerates, can be obtained. By selecting the number of the seed crystals, the particle size can be controlled. In addition, according to the kind of the raw material powder, single crystal particles consisting of polyhedrons having uniform size and shape can be obtained.

While the particles may be weakly agglomerated depending on the kind of the raw material or the production conditions, they can be easily comminuted by, for example, a jet mill, to obtain the intended double metal oxide powder containing no or few agglomerates.

Depending on the kind of the raw material or the production conditions, the product may contain a side product other than the intended double metal oxide which is the compound of the two or more metal elements and oxygen atom, or the unreacted raw material metal oxide(s). In such case, since an amount of the side product or the unreacted raw material is very small, the intended double metal oxide powder can be obtained by a simple separation method such as washing.

A number average particle size of the double metal oxide powder produced by the method of the present invention is not limited. It is preferably from 0.1 to 300 $\mu$m, and a $D_{90}/D_{10}$ ratio, which will be defined later, is preferably 10 or less, more preferably 5 or less.

According to the present invention, it is possible to easily produce the double metal oxide powder having the above described excellent properties. The present invention is effective in the production of, in particulars $LiNbO_3$, $LiTaO_3$, $BaTiO_3$, $PbTiO_3$, $PbZrO_3$, $SrTiO_3$ and their solid solutions.

Since the double metal oxide powder produced by the method of the present invention contains fewer agglomerates, and has the narrow particle size distribution and the polyhedral shape, it can be preferably used as a raw material powder of a metal oxide base ceramic which is used as a functional material or a constructional material, as a metal oxide powder to be used in the dispersed state such as a filler or a pigment, a raw material powder for the production of a single crystal, or a raw material powder for flame spraying.

The obtained double metal oxide powder is compounded in a rubber, a resin, and so on to form a piezoelectric composite, which can be used as a piezoelectric part such as an actuator, a pressure sensor, an ultrasonic wave detector, and the like. In addition, by making use of its good dispersibility, it can be used as a raw material of a ceramic sintered body such as a capacitor, a piezoelectric device, and the like. Further, it can be used as a raw material of a fluorescent by doping a rare earth metal ion.

EXAMPLES

The present invention will be illustrate by the following Examples, which do not limit the scope of the present invention in any way.

In the Examples, the measurements of the properties are carried out as follows:

1. Number average particle size of metal oxide powder

A scanning electron microscopic photograph of a metal oxide powder was taken using an electron microscope (T-300 manufactured by Nippon Electron Co., Ltd.). From the photograph, 80 to 100 particles were selected and image analyzed to calculate equivalent circle diameters of the particles and their average. The equivalent circle diameter is a diameter of a circle having the same area as that of each particle in the photograph.

2. Particle size distribution of metal oxide powder

The particle size distribution was measured using a master sizer (manufactured by Malvern Instrument, Inc.) or a laser diffraction type particle size distribution analyzer (SALD-1100 manufactured by Shimadzu Corporation).

The metal oxide powder was dispersed in a 0.5% aqueous solution of sodium hexametaphosphate, and particle sizes at 10%, 50% and 90% accumulation, respectively from the smallest particle size side in a cumulative particle size curve of the particles were measured as the $D_{10}$, $D_{50}$ and $D_{90}$. The $D_{50}$ was used as the particle size of the agglomerate. The $D_{90}/D_{10}$ ratio was calculated as the criterion of the particle size distribution.

3. Crystal phase of metal oxide powder

The crystal phase of the metal oxide powder was measured by the X-ray diffraction method (RAD-C manufactured by Rigaku Co., Ltd.)

4. BET specific surface area of metal oxide powder

A BET specific surface area of a metal oxide powder was measured by FLOWSORB-II (manufactured by Micromelitics).

Iodine/hydrogen iodide gas was prepared using a sublimated gas of ammonium iodide which was obtained by heating ammonium iodide (Reagent Grade, manufactured by Wako Junyaku Co., Ltd) at a temperature higher than its sublimation point.

In a furnace muffle having an inner volume of 300 ml, when 0.3 g of ammonium iodide was used, it was completely vaporized and decomposed at 800° C. to provide a gas consisting of 75 vol. % of nitrogen gas, 15 vol. % of oxygen gas, 8 vol. % of steam and 2 vol. % of iodine (I, $I_2$) which was generated by the decomposition of hydrogen iodide.

When 3 g of ammonium iodide was used, it provided a gas consisting of 47 vol. % of nitrogen gas, 20 vol. % of hydrogen iodide gas, 19 vol. % of steam, 13 vol. % of hydrogen and 1 vol. % of iodine (I, $I_2$) which was generated by the decomposition of hydrogen iodide.

The raw material powder was filled in a container made of alumina or platinum. A depth of the filled powder was 5 mm.

The calcination was carried out in a cylindrical furnace having a quartz muffle or an alumina muffle (manufactured by Motoyama Co., Ltd.). With flowing the air or the nitrogen gas, temperature was raised at a heating rate of from 300° C./hr. to 500° C./hr., and when the temperature reached an atmosphere gas introduction temperature, the atmosphere gas was introduced.

A concentration of the atmosphere gas was adjusted by controlling gas flow rates by flow meters. The total pressure of the atmosphere was 1 atmosphere in all Examples.

After the temperature reached the predetermined temperature, the powder was maintained at that temperature for a predetermined period of time. They will be referred to as "maintaining temperature" (calcination temperature) and "maintaining time" (calcination time). After the predetermined maintaining time, the powder was spontaneously cooled to obtain the intended metal oxide powder.

Example 1

Using a ball mill, barium carbonate (manufactured by WAKO JUNYAKU) (0.5 mole) and metatitanic acid (manufactured by TITANIUM INDUSTRIES) (0.5 mole) were mixed in ethanol, and the mixture was dried by a rotary evaporator to obtain a powder. One gram of this powder was filled in the platinum container.

Then, the container and a boat containing ammonium iodide (3 g) were set in the quartz muffle of the furnace and heated from room temperature at a heating rate of 600° C./hr. and then the powder was calcined at 1100° C. for 60 minutes, while flowing the air at a flow rate of 20 ml/min., followed by spontaneous cooling to obtain barium titanate powder.

Figure 1:
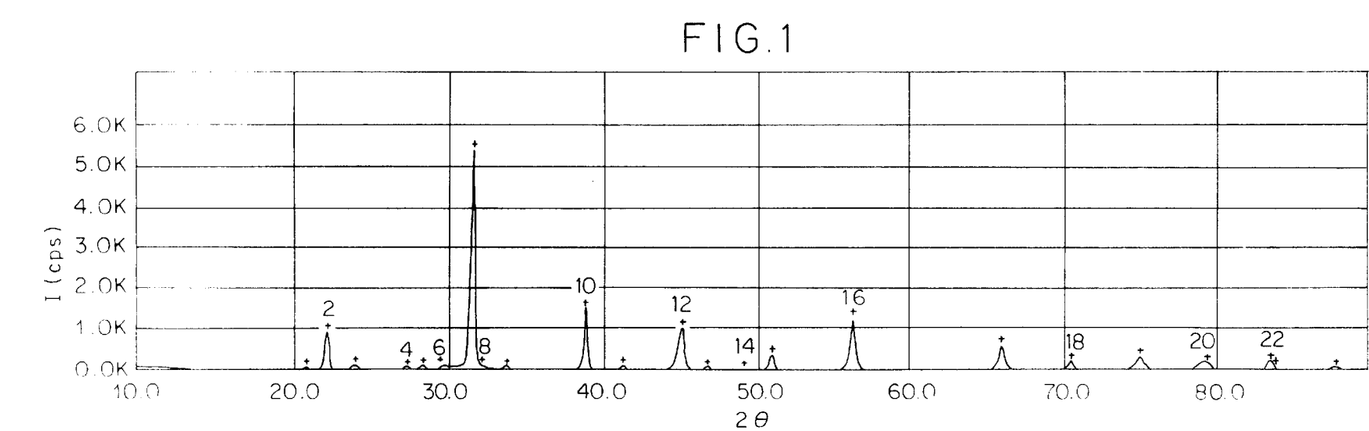
FIG. 1 is an X-ray diffraction pattern of the double metal oxide powder produced in Example 1.

FIG. 1 shows the X-ray diffraction pattern of the obtained barium titanate powder. According to this analysis, the powder obtained in this Example was found to have a perovskite crystal form represented by $BaTiO_3$, and no other peak was found.

As the result of the observation by the scanning electron microscope, the powder had the number average particle size of 0.8 $\mu$m, and $D_{50}$ of 1.2 $\mu$m and consisted of the particles having high crystallinity and few agglomerates. The $D_{90}/D_{10}$ ratio was less than 5.

Figure 2:
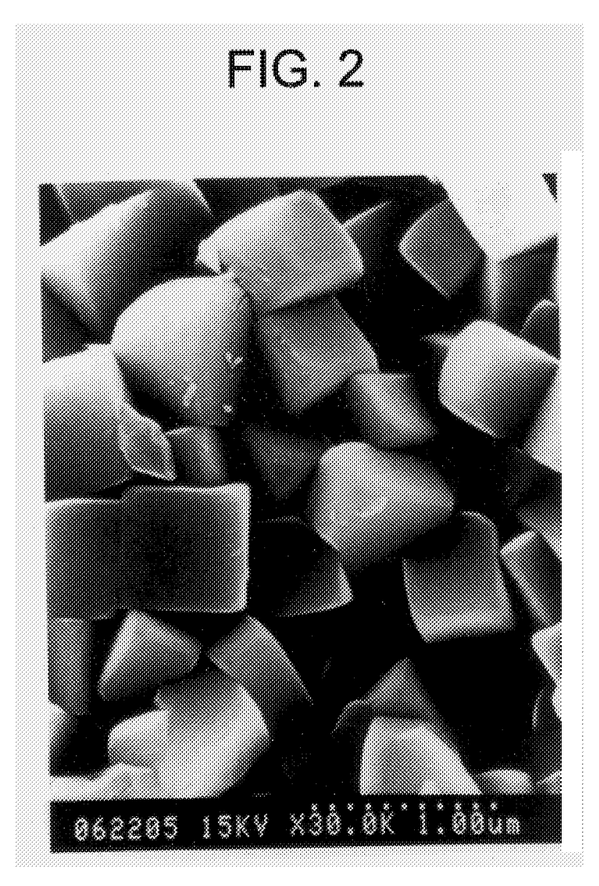
FIG. 2 is a scanning microscopic photograph of the double metal oxide powder produced in Example 1 (magnification of 30,000).

As seen from the electron microscopic photograph of FIG. 2, the particle had the very high crystallinity and the polyhedral shape.

Example 2

Using a ball mill, lead oxide powder (manufactured by WAKO JUNYAKU) (0.5 mole) and metatitanic acid (manufactured by TITANIUM INDUSTRIES) (0.5 mole) were mixed in ethanol, and the mixture was dried by a rotary evaporator to obtain a powder. One gram of this powder was filled in the platinum container.

Then, the container and a boat containing ammonium iodide (0.5 g) were set in the quartz muffle of the furnace and heated from room temperature at a heating rate of 600° C./hr. and then the powder was calcined at 900° C. for 60 minutes, while flowing the air at a flow rate of 20 ml/min., followed by spontaneous cooling to obtain lead titanate powder.

According to the X-ray diffraction analysis, the lead titanate powder was found to have a perovskite crystal form represented by $PbTiO_3$, and no other peak was found.

As the result of the observation by the scanning electron microscope, the powder had the number average particle size of 0.5 $\mu$m, and $D_{50}$ of 0.9 $\mu$m and consisted of the particles having high crystallinity and few agglomerates. The particle had the very high crystallinity and the polyhedral shape.

Example 3

Using a ball mill, lead oxide powder (manufactured by WAKO JUNYAKU) (0.5 mole), metatitanic acid (manufactured by TITANIUM INDUSTRIES) (0.25 mole) and zirconia powder (manufactured by DAIICHI RARE EARTH ELEMENT CHEMICALS) (0.25 mole) were mixed in ethanol, and the mixture was dried by a rotary evaporator to obtain a powder. One gram of this powder was filled in the platinum container.

Then, the container and a boat containing ammonium iodide (1 g) were set in the quartz muffle of the furnace and heated from room temperature at a heating rate of 600° C./hr. and then the powder was calcined at 1000° C. for 60 minutes, while flowing the air at a flow rate of 20 ml/min., followed by spontaneous cooling to obtain a powder of $Pb(Zr,Ti)O_3$ (hereinafter sometimes referred to as "PZT").

According to the X-ray diffraction analysis, the PZT powder was found to have a perovskite crystal form represented by $Pb(Zr,Ti)O_3$, and no other peak was found.

Figure 3:
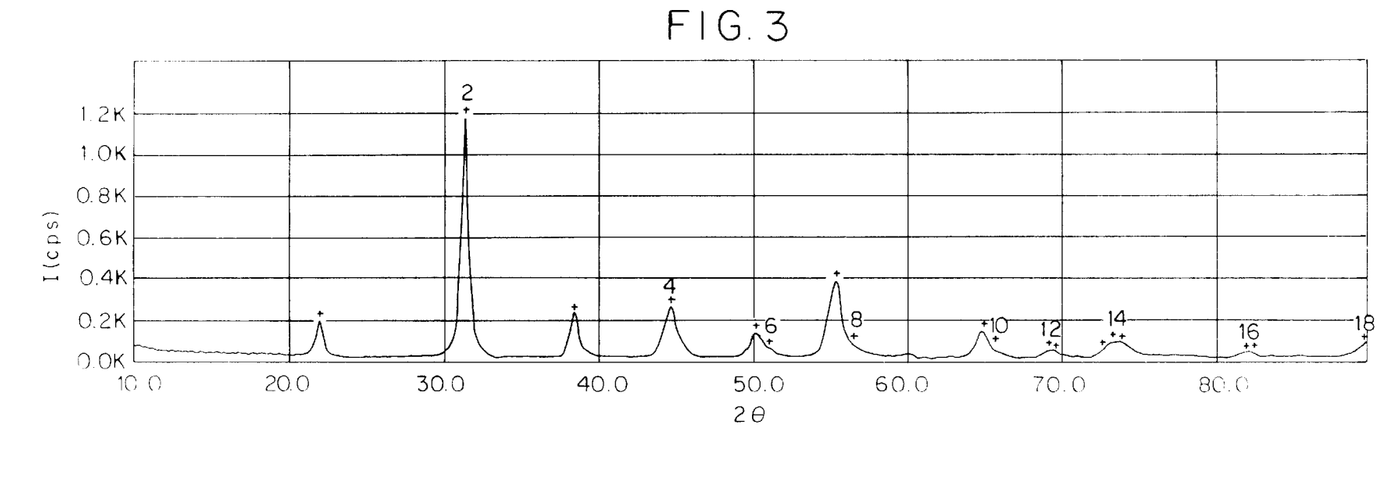
FIG. 3 is an X-ray diffraction pattern of the double metal oxide powder produced in Example 3.

As the result of the observation by the scanning electron microscope, the powder had the number average particle size of 0.3 μm, and $D_{50}$ of 0.6 μm and consisted of the particles having high 2θ crystallinity and few agglomerates. The particle had the very high crystallinity and the polyhedral shape. The X-ray diffraction pattern of the PZT powder is shown in FIG. 3.

Example 4

Using a ball mill, lithium nitrate (manufactured by WAKO JUNYAKU) (0.5 mole) and tantalum oxide (manufactured by WAKO JUNYAKU) (0.5 mole) were mixed in isopropanol, and the mixture was dried by a rotary evaporator to obtain a powder. One gram of this powder was filled in the platinum container.

Then, the container and a boat containing ammonium iodide (1 g) were set in the quartz muffle of the furnace and heated from room temperature at a heating rate of 600° C./hr. and then the powder was calcined at 1000° C. for 60 minutes, while flowing the air at a flow rate of 20 ml/min. and hydrogen iodide from a cylinder at a flow rate of 10 ml/min., followed by spontaneous cooling to obtain $LiTaO_3$ powder.

According to the X-ray diffraction analysis, the obtained powder was found to have a perovskite crystal form represented by $LiTaO_3$, and no other peak was found.

As the result of the observation by the scanning electron microscope, the powder had the number average particle size of 0.3 μm, and $D_{50}$ of 0.7 μm and consisted of the particles having few agglomerates. The particle had the very high crystallinity and the polyhedral shape.

Comparative Example 1

The same mixed powder of barium carbonate and metatitanic acid as used in Example 1 (1 g) was filled in the platinum container.

Then, the container was set in the quartz muffle of the furnace and heated from room temperature at a heating rate of 600° C./hr. and then the powder was calcined at 1100° C. for 60 minutes, while flowing the air at a flow rate of 20 ml/min., followed by spontaneous cooling to obtain a barium titanate powder.

According to the X-ray diffraction analysis, the obtained powder was found to have a perovskite crystal form represented by $BaTiO_3$.

Figure 4:
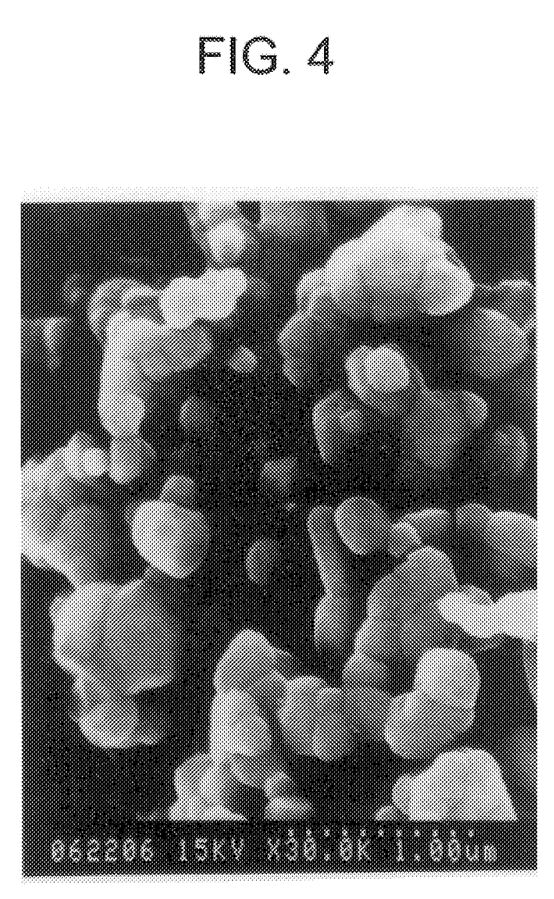
FIG. 4 is a scanning microscopic photograph of the double metal oxide powder produced in Comparative Example 1 (magnification of 30,000).

As the result of the observation by the scanning electron microscope, the powder had the number average particle size of 0.3 μm, and $D_{50}$ of 2.5 μm and consisted of the agglomerated particles. FIG. 4 shows the electron microscopic photograph of this powder. While the powder was crystallized according to the X-ray diffraction analysis, no single crystal particle was found in the observation by the scanning electron microscope.

Comparative Example 2

The same mixture of lead oxide and metatitanic acid as used in Example 2 (1 g) was filled in the platinum container.

Then, the container was set in the quartz muffle of the furnace and heated from room temperature at a heating rate of 600° C./hr. and then the powder was calcined at 900° C. for 60 minutes, while flowing the air at a flow rate of 20 ml/min. in the absence of ammonium iodide, followed by spontaneous cooling to obtain lead titanate powder.

According to the X-ray diffraction analysis, the obtained lead titanate powder was found to be a mixture of a perovskite crystal phase represented by $PbTiO_3$ and a pyrochlore crystal phase represented by $Pb_2Ti_2O_6$.

As the result of the observation by the scanning electron microscope, the powder had the number average particle size of 0.5 μm, and $D_{50}$ of 1.8 μm and consisted of the agglomerated particles. The X-ray diffraction pattern had low peaks, and the crystallinity was lower than that of the powder obtained in Example 2.

Comparative Example 3

The same mixture of lead oxide and metatitanic acid as used in Example 2 (1 g) was filled in the platinum container.

Then, the container was set in the quartz muffle of the furnace and heated from room temperature at a heating rate of 600° C./hr. and then the powder was calcined at 900° C. for 60 minutes, while flowing the air at a flow rate of 20 ml/min. and hydrogen chloride gas from a cylinder at a flow rate of 20 ml/min., followed by spontaneous cooling to obtain lead titanate powder.

According to the X-ray diffraction analysis, the obtained lead titanate powder was found to be a mixture of a rutile crystal phase represented by $TiO_2$ and an anatase crystal phase of titanium oxide. No peak assigned to the perovskite crystal form represented by $PbTiO_3$ was found.

When the powder was washed with water and filtrated, Pb and Cl ions were found in a filtrate. It was assumed that Pb formed $PbCl_2$, a part of which was dissipated, and other part of which remained in the powder.

Example 5

Using a ball mill, barium carbonate (manufactured by WAKO JUNYAKU) (0.5 mole) and metatitanic acid (manufactured by TITANIUM INDUSTRIES) (0.5 mole) were mixed in ethanol, and the mixture was dried by a rotary evaporator to obtain a powder. One gram of this powder was filled in the platinum container.

Then, the container and a boat containing ammonium iodide (0.3 g) were set in the quartz muffle of the furnace and heated from room temperature at a heating rate of 600° C./hr. and then the powder was calcined at 1000° C. for 60 minutes, while flowing the air at a flow rate of 20 ml/min., followed by spontaneous cooling to obtain barium titanate powder.

According to the X-ray diffraction analysis, the powder obtained in this Example was found to have a perovskite crystal form represented by $BaTiO_3$, and no other peak was found.

As the result of the observation by the scanning electron microscope, the powder had the number average particle size of 0.2 μm, and $D_{50}$ of 0.6 μm and consisted of the particles having high crystallinity and few agglomerates. The $D_{90}/D_{10}$ ratio was less than 10.

Figure 5:
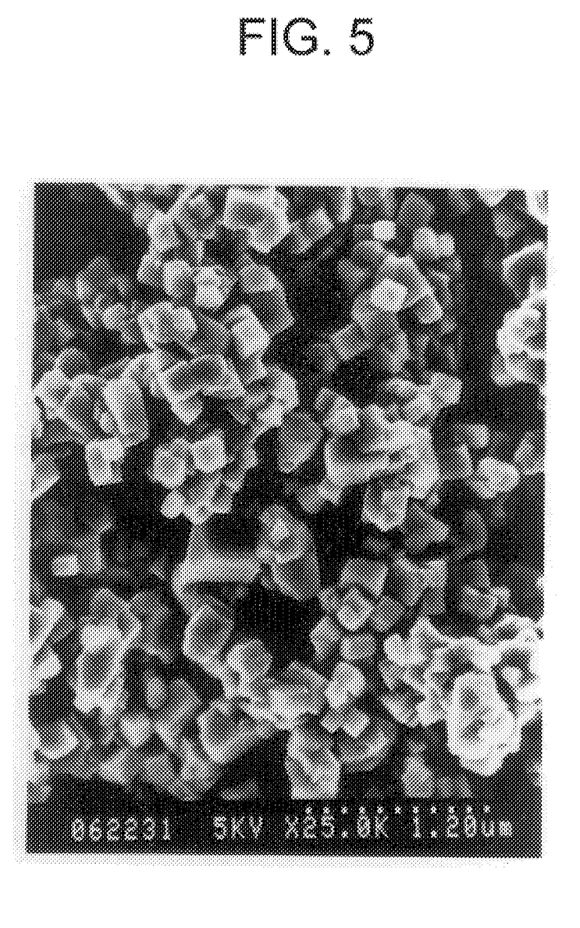
FIG. 5 is a scanning microscopic photograph of the double metal oxide powder produced in Example 5 (magnification of 25,000).

As seen from the electron microscopic photograph of FIG. 5, the particle had the very high crystallinity and the polyhedral shape.

What is claimed is:

1. A method for producing a double metal oxide of the general formula:

$$XMO_3$$

wherein X is at least one metal element selected from the group consisting of Li, Na, K, Pb, Ba, Mg, Ca, Sr, La, Y and Bi, and M is at least one metal element selected from the group consisting of Al, Mn, Ti, Zr, Sn, Mg, Zn, Fe, Co, Ni, Nb, Ta and W, comprising calcining a mixture of a simple oxide of metal X and a simple oxide of metal M; amorphous double metal oxide particles comprising X and M or their mixture; or metal oxide precursors which are converted to said simple metal oxides or said double metal oxide, in the presence of iodine or hydrogen iodide.

2. The method according to claim 1, wherein a concentration of said iodine or hydrogen iodide is at least 1 vol. % of an atmospheric gas in which the calcination is carried out.

3. The method according to claim 2, wherein a concentration of said iodine or hydrogen iodide is at least 5 vol. % of the an atmospheric gas.

4. The method according to claim 1, wherein a calcination temperature is from 500° to 1500° C.

5. The method according to claim 4, wherein said calcination temperature is from 600° to 1400° C.

6. The method according to claim 4, wherein said calcination temperature is from 800° to 1200° C.

7. The method according to claim 1, wherein said double oxide is a compound selected from the group consisting of $LiNbO_3$, $LiTaO_3$, $BaTiO_3$, $PbTiO_3$, $PbZrO_3$, $SrTiO_3$ and their solid solutions.

* * * * *